(12) United States Patent
Ohtsuka

(10) Patent No.: US 8,339,655 B2
(45) Date of Patent: Dec. 25, 2012

(54) IMAGE FORMING APPARATUS AND IMAGE FORMING METHOD FOR DISPLAYING A FIRST IMAGE WHILE A CORRESPONDING SECOND IMAGE IS BEING PROCESSED

(75) Inventor: Masaru Ohtsuka, Tachikawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 810 days.

(21) Appl. No.: 12/486,259

(22) Filed: Jun. 17, 2009

(65) Prior Publication Data

US 2009/0323105 A1 Dec. 31, 2009

(30) Foreign Application Priority Data

Jun. 26, 2008 (JP) ................. 2008-166773

(51) Int. Cl.
*G06K 15/00* (2006.01)
*G03G 15/00* (2006.01)
*G06F 3/048* (2006.01)
*G06F 3/14* (2006.01)

(52) U.S. Cl. ......... 358/1.18; 399/81; 715/828; 715/830; 715/864

(58) Field of Classification Search ............... 358/1.18; 399/81; 715/828, 830, 864
See application file for complete search history.

(56) References Cited

U.S. PATENT DOCUMENTS

| 5,937,232 | A | * | 8/1999 | Taguchi et al. ............ 399/81 |
| 7,190,473 | B1 | * | 3/2007 | Cook et al. ............ 358/1.15 |
| 2005/0052659 | A1 | * | 3/2005 | Jacobsen et al. ............ 358/1.1 |
| 2007/0006099 | A1 | * | 1/2007 | Johnson et al. ............ 715/828 |
| 2008/0273110 | A1 | * | 11/2008 | Joza et al. ............ 348/333.05 |

FOREIGN PATENT DOCUMENTS

| JP | 2005-027087 | 1/2005 |
| JP | 2006-221406 A | 8/2006 |

OTHER PUBLICATIONS

Notification of Reasons for Refusal issued in the corresponding Japanese Patent Application No. 2008-166773 dated May 25, 2010, and an English Translation thereof.

* cited by examiner

*Primary Examiner* — Charlotte M Baker
*Assistant Examiner* — Fred Guillermety
(74) *Attorney, Agent, or Firm* — Buchanan Ingersoll & Rooney PC

(57) ABSTRACT

Disclosed is an image forming apparatus including: a display section for executing display based on image data including a plurality of images; a first image processing section for generating first images respectively corresponding to the images included in the image data, to which an image process based on information of a job is not executed; a second image processing section for generating a second image obtained by executing the image process based on the information of the job to the image data of the first image currently displayed in the display section; and a control section for causing the display section to display the first image corresponding to the image data to which the job is set and to switch the currently displayed first image to the corresponding second image after completing a generation of the second image by the second image processing section.

16 Claims, 8 Drawing Sheets

IMAGE FORMING APPARATUS AND IMAGE FORMING METHOD FOR DISPLAYING A FIRST IMAGE WHILE A CORRESPONDING SECOND IMAGE IS BEING PROCESSED

BACKGROUND OF THE INVENTION

1. Field of the Invention

The present invention relates to an image forming apparatus and an image forming method.

2. Description of Related Art

The following conventional image forming system has been known. That is, the image forming system has a function of displaying an image, such as a preview image, on a display at the time of forming an image based on obtained image data in order to check the content of the image data. The preview image indicates an image having been subjected to image processing, such as editing and post-processing.

Moreover, a page turning function enabling a user to search a desired page by turning a page of an image displayed on a display has been known in the image forming system equipped with the above display function (see, for example, Japanese Patent Application Laid-Open Publication No. 2006-221406).

However, if the page turning is executed to a preview image, which is an image including the information of jobs, such as editing and post-processing, then the image processing of the preview image needs a long time, and the time from an operation of turning of a page to the display of the next page becomes long. Consequently, the conventional page turning function has a problem of taking a long time for checking a page. A very long time is needed especially at the time of turning hundreds of pages continuously, which causes the problem of taking the long time seriously for checking the pages.

SUMMARY OF THE INVENTION

The present invention is directed to provide an image forming apparatus and an image forming method, each enables a user to rapidly check whether a page under display in a display section is a desired page or not at the time of searching the desired page in the page turning of a preview image.

According to a first aspect of the present invention, there is provided an image forming apparatus including: a display section for executing display based on image data including a plurality of images; a first image processing section for generating first images respectively corresponding to the images included in the image data, to which an image process based on information of a job is not executed; a second image processing section for generating a second image obtained by executing the image process based on the information of the job to the image data of the first image currently displayed in the display section; and a control section for causing the display section to display the first image corresponding to the image data to which the job is set and to switch the currently displayed first image to the corresponding second image after completing a generation of the second image by the second image processing section.

Preferably, the image forming apparatus further includes an operation section for issuing an instruction of changing the first or second image currently displayed in the display section to the first image different from the currently displayed first or second image, wherein the control section causes the display section to display the first image at a first timing and to display the corresponding second image at a second timing after the first timing if the instruction is issued with the operation section.

Preferably, the control section causes the display section to display the first image different from the currently displayed first image if the instruction is issued with the operation section during a period from the first timing to the second timing, and to display the second image corresponding to the currently displayed first image at the second timing if no instruction is issued with the operation section during the period from the first timing to the second timing.

Preferably, the control section causes the display section to continuously display and change the first image at a predetermined interval of the number of images if the instruction with an operation section continues for a predetermined time or longer, and to display the second image, which corresponds to the image data of the first image displayed at a time when the continuing instruction with the operation section ends.

Preferably, the image forming apparatus further includes a stop section for issuing an instruction to stop changing the first image to the first image different from the currently displayed first image, wherein the control section causes the display section to continuously display and change the first image at a predetermined interval of the number of images if the instruction with the operation section continues for a predetermined time or longer, and to display the second image, which corresponds to the image data of the first image displayed at a time when the stop instruction is issued with the stop section.

Preferably, the image forming apparatus further includes a setting section for setting the predetermined interval of the number of images.

According to a second aspect of the present invention, there is provided an image forming method that includes the steps of: generating first images respectively corresponding to a plurality of images included in image data, to which an image process based on information of a job is not executed; generating a second image obtained by executing the image process based on the information of the job to the image data of the first image currently displayed in a display section; and displaying the first image corresponding to the image data to which the job is set in the display section, and switching the currently displayed first image to the corresponding second image after completing a generation of the second image.

Preferably, the step of displaying the first image displays the first image in the display section at a first timing and displays the second image in the display section at a second timing after the first timing if an instruction of changing the first or second image currently displayed in the display section to the first image different from the currently displayed first or second image with an operation section for issuing the instruction.

Preferably, the step of displaying the first image displays the first image different from the currently displayed first image in the display section if the instruction is issued with the operation section during a period from the first timing to the second timing, and displays the second image corresponding to the currently displayed first image at the second timing if no instruction is issued with the operation section during the period from the first timing to the second timing.

Preferably, the step of displaying the first image continuously displays and changes the first image at a predetermined interval of the number of images if the instruction with the operation section continues for a predetermined time or longer, and displays the second image, which corresponds to the image data of the first image displayed at a time when the continuing instruction with the operation section ends.

Preferably, the step of displaying the first image continuously displays and changes the first image in the display section at a predetermined interval of the number of images if the instruction with an operation section continues for a predetermined time or longer, and displays the second image, which corresponds to the image data of the first image displayed at a time when a stop instruction is issued with a stop section for issuing the stop instruction to stop changing the first image to the first image different from the currently displayed first image.

Preferably, further comprising a step of setting the predetermined interval of the number of images with the setting section.

According to an embodiment of the present invention, since the first image, the image generation of which takes a shorter time, and the second image, the image generation of which takes a longer time, are stepwise displayed in the display section, a page can be recognized at the step at which the first image is displayed, and consequently the check of whether the page under display in the display section is the desired page or not can be performed rapidly.

Moreover, according to an embodiment of the present invention, the check of whether the page under display in the display section is the desired page or not can be performed rapidly especially at the time of instructing page turning with the operation section.

Moreover, according to an embodiment of the present invention, since only the second image of a desired page is displayed after the first image has been continuously displayed when page turning is continuously instructed, the displays of unnecessary second images are omitted, and the processing speed of the display of the desired page can be shortened. Then the arrival to the desired page can be performed rapidly.

Moreover, according to an embodiment of the present invention, the time of continuous display of the first image before the second image of a desired page is displayed can be shortened, and the arrival to the desired page can be performed more rapidly.

Moreover, according to an embodiment of the present invention, it is unnecessary to continue to depress the operation section when the page turning of a preview image is performed to a large degree, and consequently the usability of the image forming apparatus can be made to be better.

Moreover, according to an embodiment of the present invention, the page interval at the time of displaying the first image continuously can be set, and consequently the usability of the image forming apparatus can be made to be better.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

First Embodiment

In the following, a first embodiment according to the present invention will be described with reference to the attached drawings.

Figure 1:
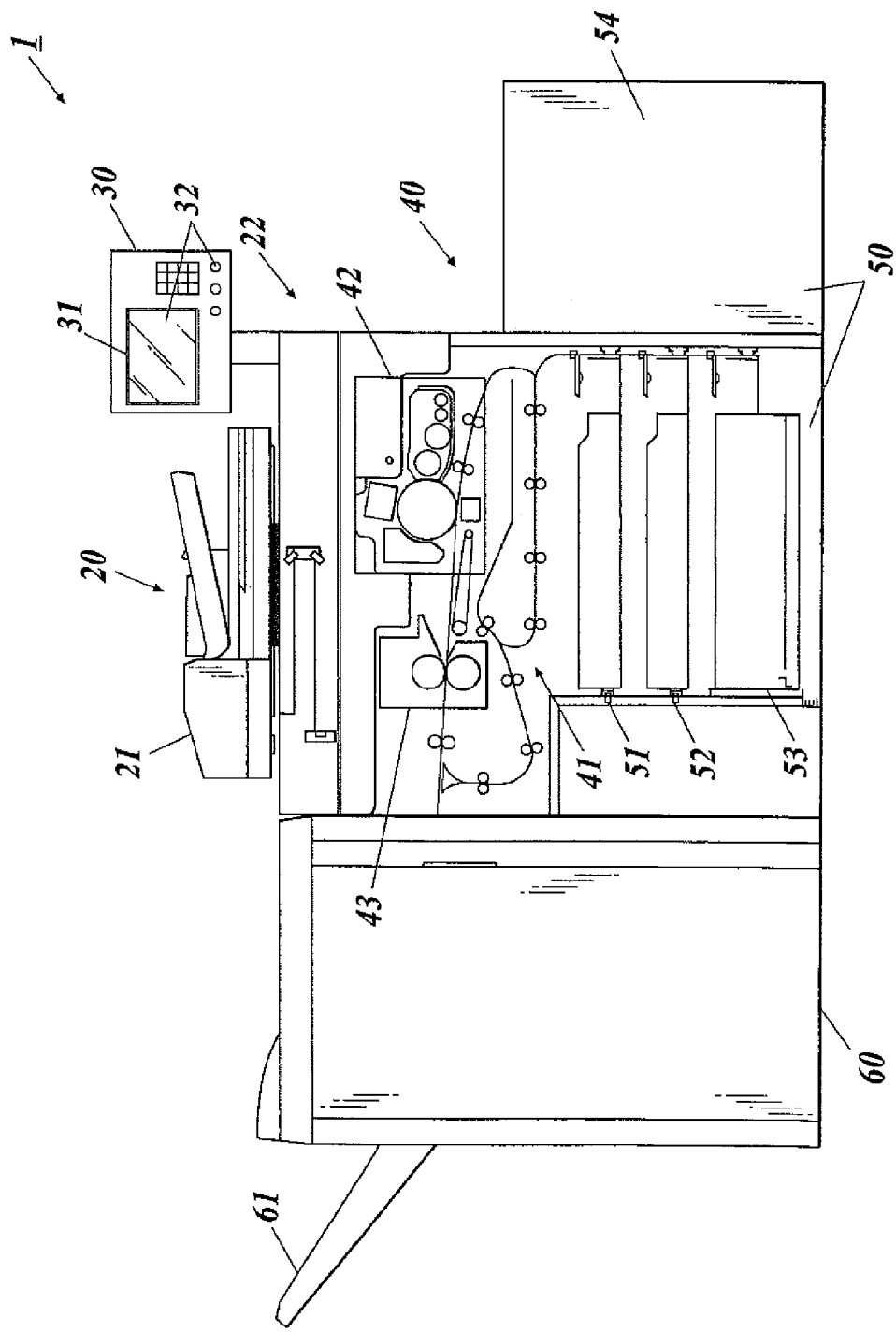
FIG. 1 is a schematic configuration view of an image forming system according to a first embodiment of the present invention.
Figure 2:
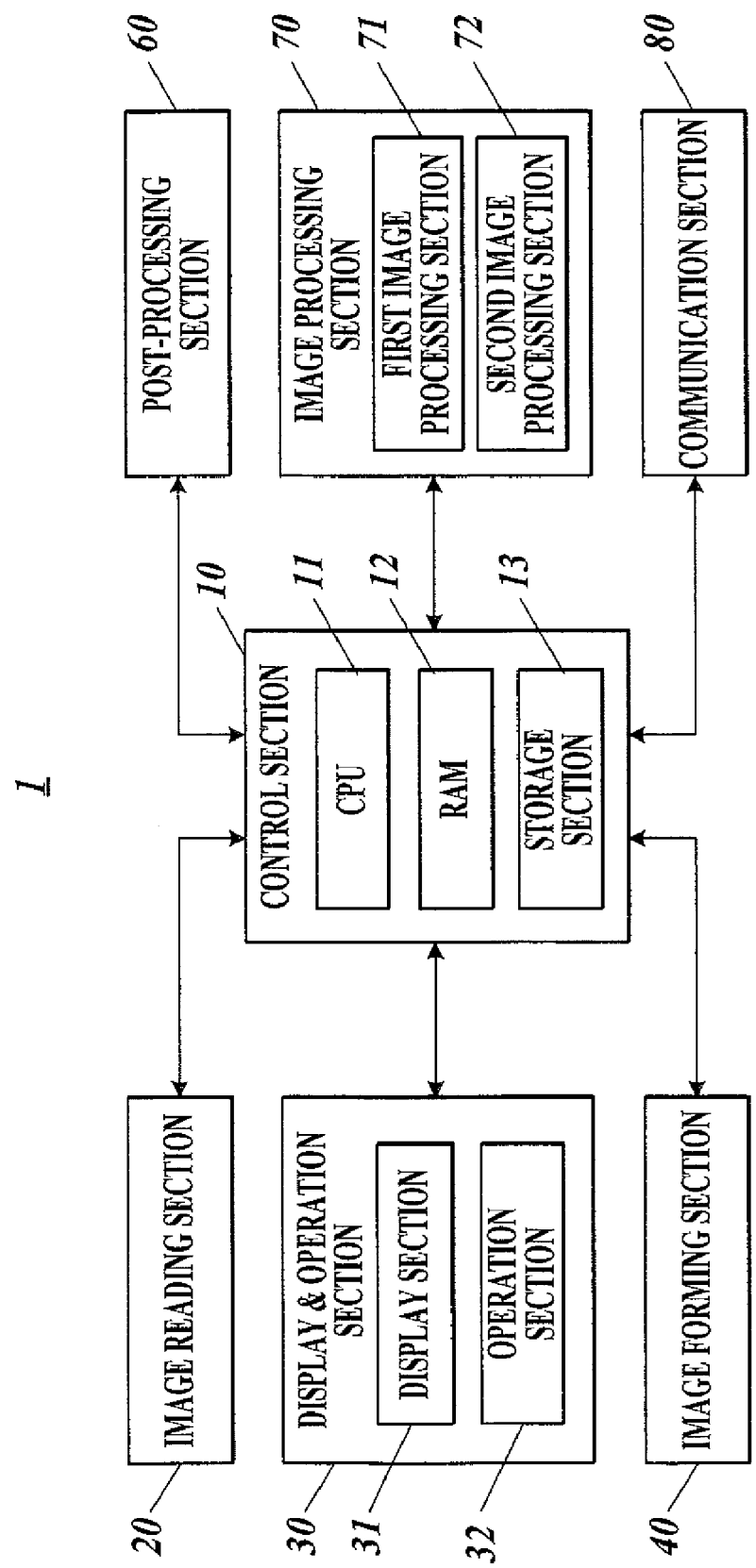
FIG. 2 is a block diagram of the image forming system according to the first embodiment.

FIG. 1 is a schematic configuration view of an image forming system (image forming apparatus) 1 according to the first embodiment, and FIG. 2 is a block diagram showing the internal configuration of the image forming system 1.

As shown in FIGS. 1 and 2, the image forming system 1 includes an image reading section 20, a display & operation section 30, an image forming section 40, a paper feeding unit 50, a post-processing section 60, an image processing section 70, a communication section 80, and a control section 10.

The image reading section 20 includes an auto document feeder (ADF) section 21, which is an automatic paper feeding mechanism, and a scanner section 22. The ADF section 21 conveys an original placed on the original stand thereof to send out the original to the scanner section 22, and the scanner section 22 performs the light scanning of the conveyed original and performs the photoelectric conversion of the reflected light from the conveyed original with line image sensor charge coupled devices (CCDs) to read the original image.

The original image data read by the image reading section 20 is subjected to various kinds of image processing, and is output to the image forming section 40 as read image data for image formation.

The display & operation section 30 includes a display section 31 composed of a display panel, such as a liquid crystal display (LCD), and an operation section 32 composed of a touch panel provided to cover the display section 31 and various operation keys. The display & operation section 30 receives an operation input by a user to output an operation signal to the control section 10, and displays an image based on image data, various setting screens, a page editing screen, various processing results, and the like, in accordance with control signals input from the control section 10.

To put it concretely, the display section 31 displays, for example, a preview region E (see FIG. 3) for displaying a preview image, which is an image of a page after being subjected to image formation based on the information of a job in conformity with a display instruction of the control section 10.

The operation section 32 outputs an operation signal according to a depressing operation of an operation key or a depressing operation of the touch panel by the user to the control section 10.

For example, the operation section 32 is operated at the time of issuing an instruction of turning a page of an image displayed in the display section 31, that is an instruction of changing the image currently displayed in the display section 31 to the image different from the currently displayed image.

Moreover, if an instruction with the operation section 32 continues for a predetermined time (T1) or longer, then a preview image is displayed in the display section 31 in a "continuous mode," which will be described later.

For example, if the predetermined time (T1) is set to three seconds, then the display mode of the display section 31 is switched to the continuous mode when the instruction with the operation section 32 continues for three seconds or longer.

Moreover, the operation section 32 can set a predetermined page interval (P1) or a display time (T2) so that images are displayed in the display section 31 every predetermined page interval (P1), that is at a predetermined interval of the number of images, or every fixed display time (T2).

For example, if the predetermined page interval (P1) is set to three pages and the display time (T2) is set to three seconds, a preview image is displayed every three pages and every three seconds.

That is, the operation section 32 is used at the time of setting the predetermined time (T1), the display time (T2) the predetermined page interval (P1), and the like, as a setting section.

Figure 3:
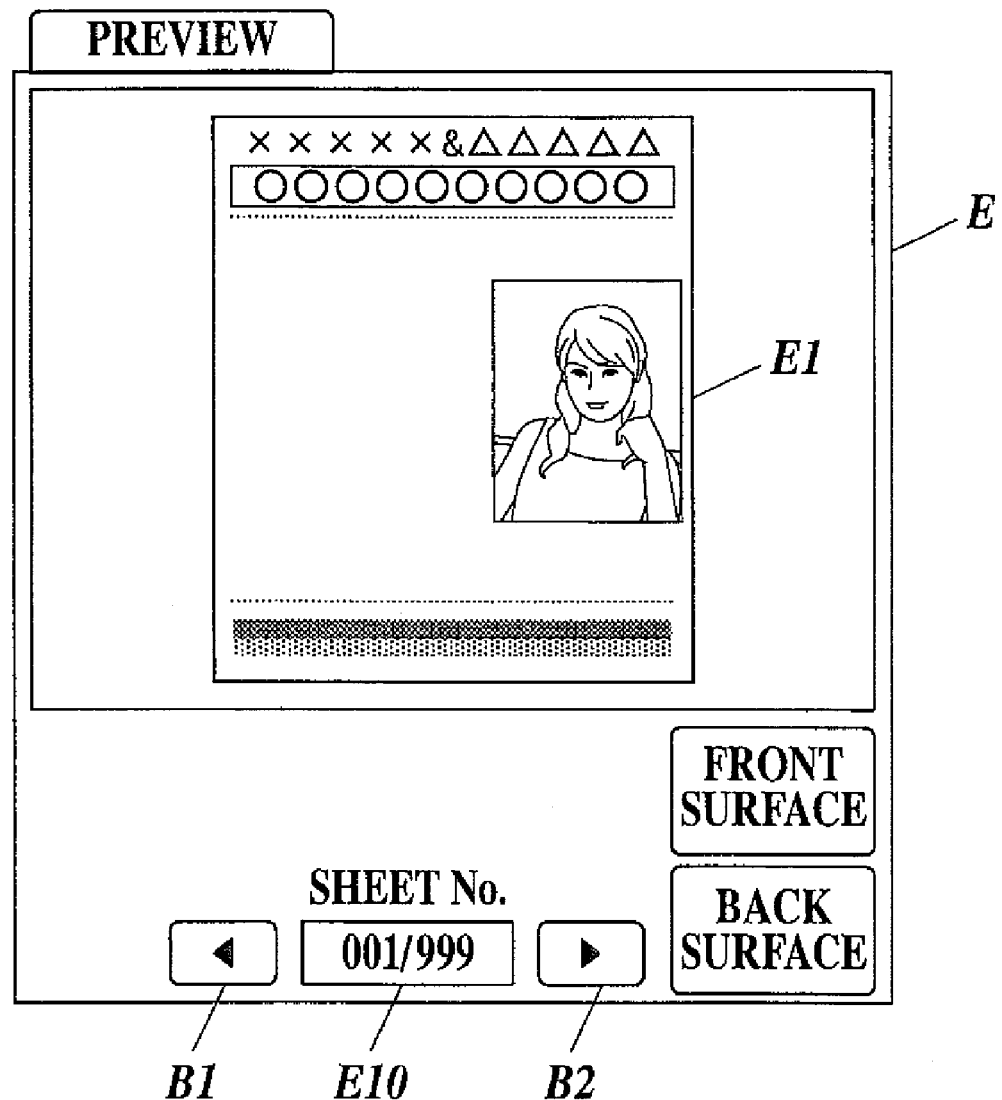
FIG. 3 is a view showing an example of a screen displayed in a display section.

An example of the preview region F displayed in the display section 31 is shown in FIG. 3.

As shown in FIG. 3, the preview region E includes an image display section E1, in which a preview image is displayed, a previous page key B1, a next page key B2, a page number display region E10, and the like.

To put it concretely, a preview image including a first image and a second image, each described below, is displayed in the image display section E1.

The previous page key B1 is a key for inputting an instruction of transferring a preview image to be displayed in the preview region E to the preview image of a page (preceding page) in the order preceding the page of the preview image under display. Moreover, the next page key B2 is a key for inputting an instruction of transferring a preview image to be displayed in the preview region E to the preview image of the next page succeeding to the page of the preview image under display.

The page number display region E10 is a region showing the page number of the preview image under display in a job.

The user operates the previous page key B1 or the next page key B2 in the operation section 32 to issue an instruction of page turning of the preview image displayed in the preview region E.

The image forming section 40 performs color image formation on a sheet of paper on the basis of image data by an electrophotographic printing system in conformity with an instruction of the control section 10, and includes a conveying mechanism 41 for conveying a sheet of paper fed from the paper feeding unit 50, an image formation main body section 42 to perform image formation on the sheet of paper, and a fixing section 43 to fix a toner image formed on the sheet of paper.

Moreover, the image formation main body section 42 includes a photosensitive drum, which is an image carrying body, a charging section to charge the photosensitive drum, an exposing section to perform exposure scanning of the surface of the photosensitive drum on the basis of image data, a developing section to make toner adhere to the photosensitive drum, a transcribing section to transcribe the toner image formed on the photosensitive drum to the sheet of paper, and a cleaning section to remove the residual toner on the photosensitive drum.

Incidentally, although the image forming section 40 is described as the one for performing color image formation by the electrophotographic printing system in the present embodiment, the image formation section 40 is not limited to this one. As the image forming section 40, the one for performing monochrome image formation may be used, and the one for performing image formation of the other systems, such as an ink-jet system, a thermal transfer system, a sublimation system, and a dot-impact system, may be used.

The paper feeding unit 50 includes four paper feeding trays 51-54.

Incidentally, although the four paper feeding trays 51-54 are provided in the present embodiment, the number of the paper feeding trays is not especially limited. Each of the paper feeding trays 51-54 can house various kinds of paper different in paper types, such as plain paper, backing paper, recycled paper, and fine quality paper, and different in size.

The post-processing section 60 performs punch (perforation) processing and staple processing to paper subjected to the image formation in the image forming section 40 in conformity with an instruction of the control section 10 to eject the paper to a copy receiving tray 61. Moreover, the post-processing section 60 may be configured to perform other types of post-processing, such as sorting processing and bookbinding processing, to the paper subjected to the image formation. Moreover, the post-processing section 60 includes the copy receiving tray 61 to receive the ejected paper subjected to image formation (or post-processing). Incidentally, when the post-processing is not performed, the paper subjected to image formation in the image forming section 40 is ejected to the copy receiving tray 61.

The image processing section 70 performs various kinds of image processing, such as analog processing, A/D conversion, shading correction, image compression processing, and variable size conversion processing, to an analog image signal input from the image reading section 20 to output digital image data in conformity with an instruction of the control section 10.

Moreover, the image processing section 70 performs image processing, such as conversion processing to the preview image data of a first image and a second image, to the image data read by the image reading section 20, the image data input from the communication section 80, or the image data stored in a storage section 13 (described below) according to an operation signal input from the operation section 32 in conformity with an instruction of the control section 10.

To put it concretely, the image processing section 70 includes a first image processing section 71 for generating the first image and a second image processing section 72 for generating the second image.

The first image processing section 71 generates the first image, which is an image including no information of jobs, in conformity with an instruction of the control section 10. That is, the first images respectively correspond to the images included in the image data, to which an image process based on information of a job is not executed.

The second image processing section 72 performs image processing, such as editing and post-processing, to the first image generated by the first image processing section 71 and thereby generates the second image, which is an image including the information of a job, in conformity with an instruction of the control section 10. That is the second image is obtained by executing the image process based on the information of the job to the image data of the first image currently displayed in the display section 31.

Here, the image generation of the second image takes a longer time than the image generation of the first image.

Figure 4A:
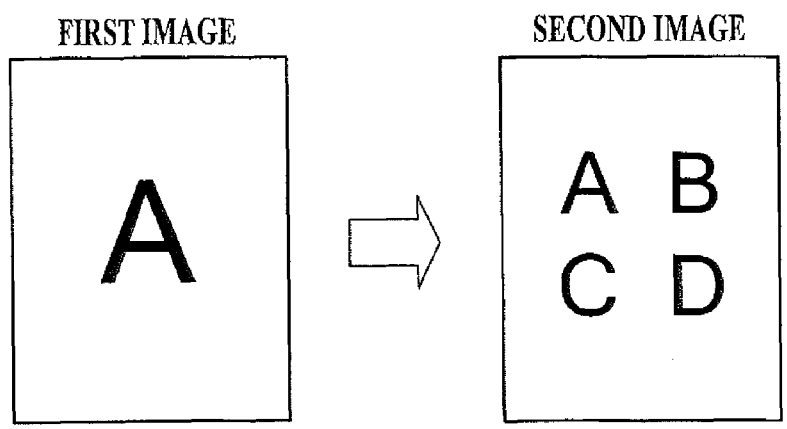
FIGS. 4A and 4B are views showing examples of first images and second images.
Figure 4B:
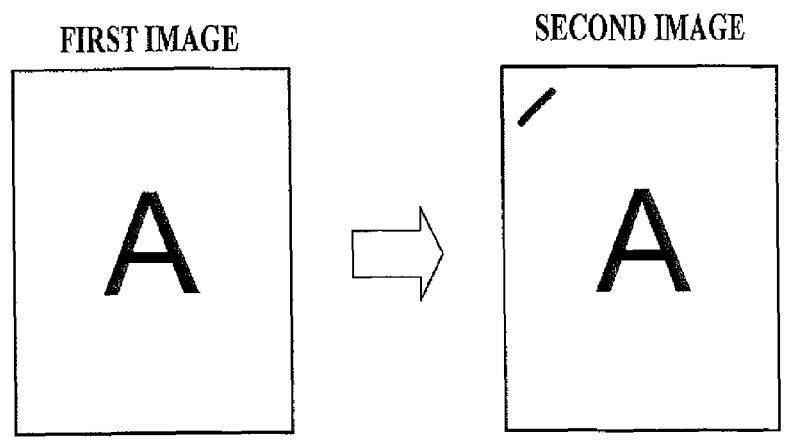

Examples of the first images and the second images are shown in FIGS. 4A and 4B here.

As shown in FIG. 4A, if the aggregation processing of images of every four pages is included as the information of a job, then, for example, the first image composed of only the image on a first page and the second image composed of aggregated images on four pages of the aggregated image data are severally displayed.

Moreover, as shown in FIG. 4B, if post-processing, such as punch (perforation) processing, is included as the information of a job, the first image not subjected to the punch processing and the second image subjected to the punch processing are severally displayed.

The communication section 80 is connected to an information processing apparatus, such as a personal computer (PC) (not shown), by communication connection, through communication lines, such as a local area network (LAN). The communication section 80 has the function of distributing the data of a job of image information transmitted from the information processing apparatus to the image forming section 40 or the storage section 13 (described below) in conformity with an instruction of the control section 10.

The control section 10 includes a central processing unit (CPU) 11, a random access memory (RAM) 12, the storage section 13, and the like, and the control section 10 performs the central control of each section of the image forming system 1.

In the control section 10, the CPU 11 develops various programs stored in the storage section 13 into the RAM 12, and the CPU 11 executes various kinds of processing in conformity with the programs developed in the RAM 12.

The RAM 12 stores the processing program for executing the page turning processing, which will be described below, of a preview image, the data generated by the execution of the processing program, and the like.

For example, the control section 10 causes the display section 31 to display the first image corresponding to the image data to which the job is set on the basis of the processing program, and the control section 10 next causes the display section to switch the first image displayed in the display section 31 to the second image after completing a generation of the second image by the second image processing section 72.

To put it concretely, when page turning is instructed with the operation section 32, the control section 10 causes the display section 31 to display the first image in the display section 31 at a "first timing," and causes the display section to display the second image in the display section 31 at a "second timing" after elapsing the first timing.

Moreover, if page turning is instructed with the operation section 32 during a period from the first timing, at which the first image is displayed, to the second timing, at which the second image is displayed, then the control section 10 causes the display section 31 to display the first image of the page after the page turning in the display section 31. If no page turning is instructed with the operation section 32 during the period from the first timing to the second timing, then the control section 10 causes the display section 31 to display the second image corresponding to the first image at the second timing.

Moreover, if an instruction with the operation section 32 continues for a predetermined time (T1) or longer, then the control section 10 judges that the operation indicates the "continuous mode" to display the first image in the display section 31 continuously every predetermined page interval, and executes the processing of the "continuous mode."

Then, when the continuation of the instruction with the operation section 32 ends, then the control section 10 judges that the "continuous mode" has ended, and displays the second image on the page at the time point at which the instruction with the operation section 32 has ended in the display section 31.

The "continuous mode" is a mode to display a preview image (first image) in the display section 31 every predetermined page interval (P1) every fixed display time (T2) here.

The storage section 13 temporarily stores the data of jobs including the image data input from the image reading section 20 or the communication section 80. Moreover, the storage section 13 stores various kinds of set information set by user's input operation with the display & operation section 30 and set information pertaining to a preview image, which will be described below.

Next, the operation of the image forming system 1 will be described with reference to FIG. 5.

Figure 5:
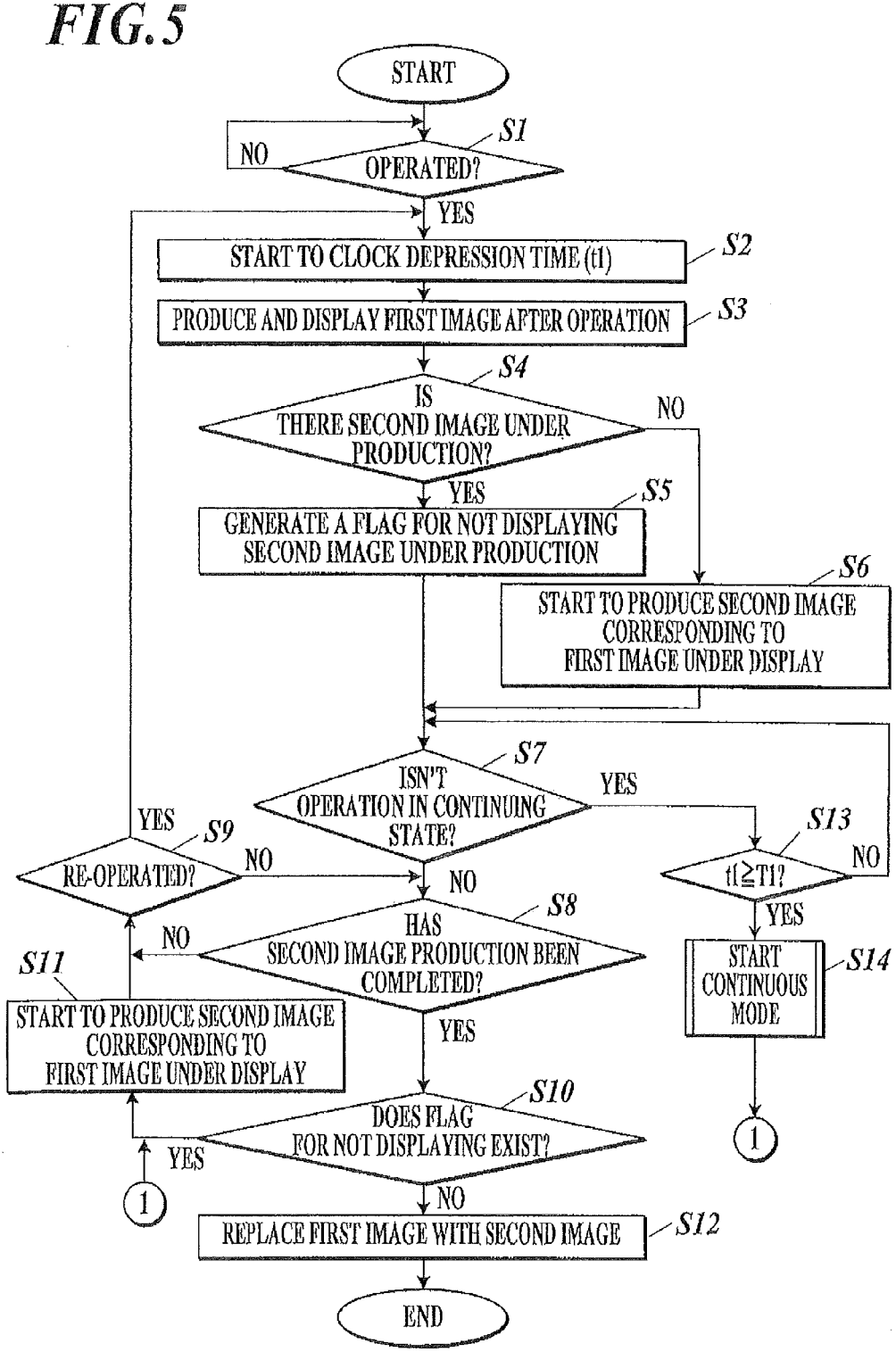
FIG. 5 is a flow chart showing page turning processing in the first embodiment.

FIG. 5 is a flow chart showing the flow of the processing of page turning in the image forming system 1.

It is supposed that the display section 31 is provided with the preview region E, as illustrated in FIG. 3, and that the image on an arbitrary page (initial page) is displayed in the preview region E at the time of executing the processing.

First, the control section 10 judges whether the operation of the operation section 32 for instructing page turning is performed or not (Step S1). If the instruction is not issued (Step S1: No), then the control section 10 repeats the judgment at Step S1.

If the instruction with the operation section 32 is issued (Step S1: Yes), then the control section 10 starts to clock the time (duration of the instruction) (t1) during which the operation section 32 is being depressed (control step) (Step S2).

Next, the control section 10 produces the first image after the operation (first image processing step) to cause the display section 31 to display the produced first image (control step) (Step S3: first timing).

Next, the control section 10 judges whether there is a second image under production or not (control step) (Step S4).

Next, if there is the second image under production (Step S4: Yes), then the control section 10 judges that the second image is not the one corresponding to the first image under display in the display section 31, and generates a flag for prohibiting the display of the second image to this image (Step S5) to move the processing to Step S7, described below (control step).

On the other hand, if there is no second image under production (Step S4: No), then the control section 10 starts to produce the second image corresponding to the first image under display in the display section 31 (second image processing step) (Step S6), and moves the processing to Step S7, described below.

At Step S7, the control section 10 judges whether the instruction issued at Step S1 with the operation section 32 is in its continuing state or not (control step) (Step S7).

Next, if the control section 10 judges that the instruction with the operation section 32 has ended (Step S7: Yes), then the control section 10 judges whether the production of the second image that has been under production at Step S4 or the second image the production of which has been started at Step S6 has been completed or not (control step) (Step S8).

Next, if the production of the second image has not been completed (Step S8: No), then the control section 10 again judges whether any operation of the operation section 32 is performed or not (Step S9). If the re-operation of the operation section 32 is not performed (Step S9: No), then the control section 10 repeats the judgment at Step S8 (control step). On the other hand, if the re-operation of the operation section 32 is performed (Step S9: Yes), then the control section 10 moves the processing to Step S2 to repeat the operation on and after Step S2 (control step).

Moreover, if the production of the second image has been completed at Step S8 (Step S8: Yes), then the control section 10 judges whether there is a flag for prohibiting the display of this second image to this image or not (control step) (Step S10).

Next, if there is the flag (Step S10: Yes), the control section 10 judges that the second image is not the one corresponding to the first image under display, and starts to produce the second image corresponding to the first image under display (second image processing step) (Step S11). After that, the control section 10 moves the processing to Step S9 to repeat the operation on and after Step S9.

On the other hand, if there are no flags at Step S10 (Step S10: No), then the control section 10 replaces the first image under display with the second image to cause the display section 31 to display the second image (control step) (Step S12: second timing), and ends the processing (FIG. 5: END).

Moreover, if the control section 10 judges that the instruction with the operation section 32 issued at Step S1 is not ended at Step S7 (Step S7: No), the control section 10 judges whether the depression time (t1) during which the operation section 32 is being depressed reaches the predetermined time (T1) or not (control step) (Step S13).

Next, if the depression time (t1) of the operation section 32 does not reach the predetermined time (T1) (Step S13: No), the control section 10 moves the processing to Step S7, and repeats the subsequent processing (control step).

On the other hand, if the depression time (t1) of the operation section 32 reached the predetermined time (T1) (Step S13: Yes), the control section 10 switches the display mode of the display section 31 to the "continuous mode," in which the preview image (first image) displayed in the display section 31 is displayed every predetermined page interval (control step) (Step S14: see FIG. 6).

After the continuous mode has ended, the control section 10 moves the processing to Step S11 to repeat the operation on and after Step S11 (control step).

Figure 6:
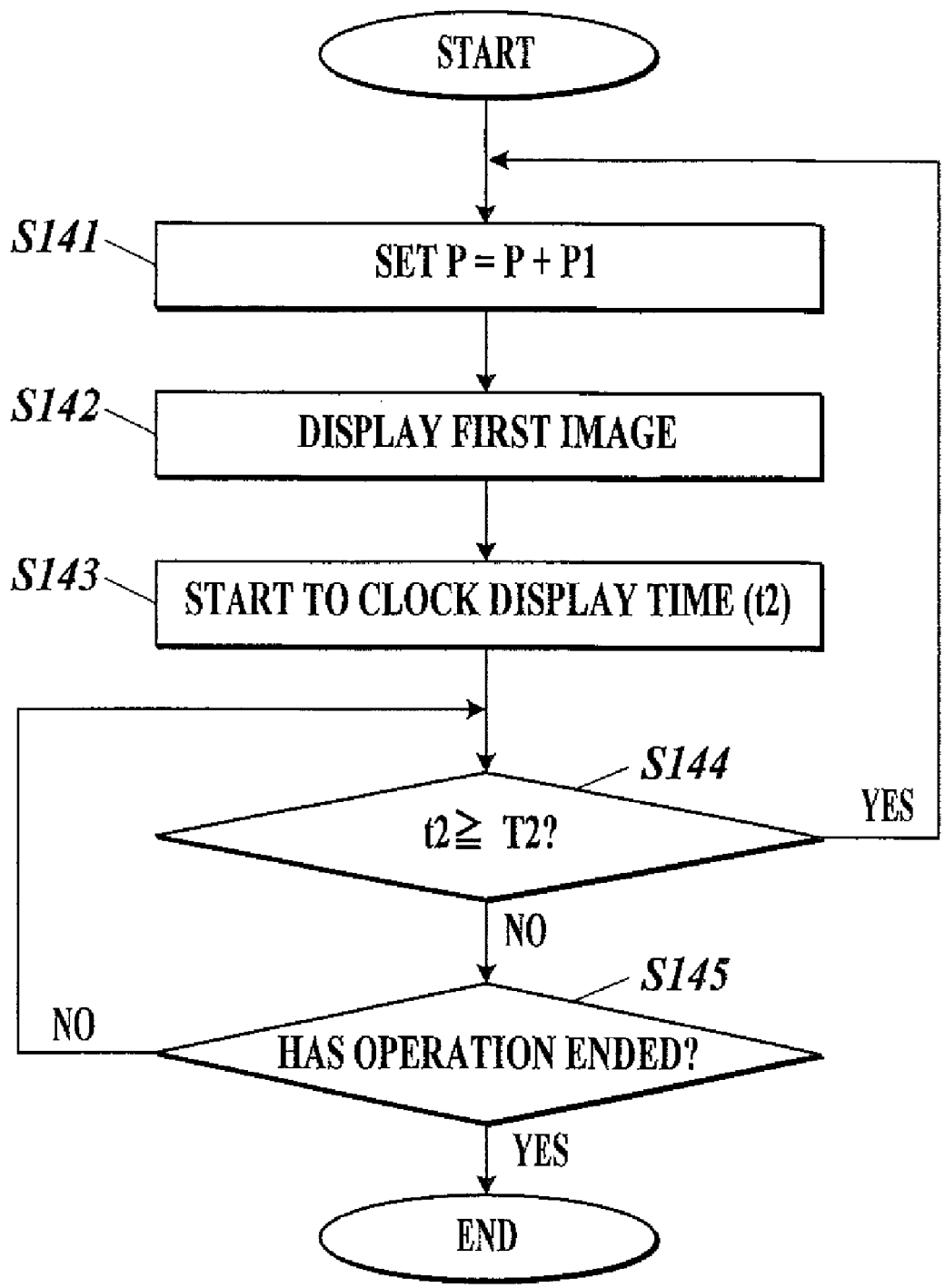
FIG. 6 is a flow chart showing the processing of a continuous mode in the first embodiment.

FIG. 6 is a flow chart showing the flow of the processing of the continuous mode.

When the processing is switched to the continuous mode (FIG. 6: START), the control section 10 performs the setting of P=P+P1 so that the preview image displayed in the display section 31 is displayed every predetermined page interval (P1) (setting step) (Step S141).

Next, the control section 10 displays the first image P (Step S142), and starts to clock (t2) (control step) (Step S143).

Next, the control section 10 judges whether the clocked time (t2) has reached the display time (T2) or not (Step S144). If the clocked time (t2) has reached the display time (T2) (Step S144: Yes), then the control section 10 returns the processing to Step S141 and repeats the processing on and after Step S141 (control step).

On the other hand, if the clocked time (t2) does not reach the display time (T2) (Step S144: No), then the control section 10 judges whether the depressing operation with the operation section 32 at Step S7 has ended or not (Step S145). If the depression operation with the operation section 32 does not end (Step S145: No), then the control section 10 returns the processing to Step S144 to repeat the processing on and after Step S144 (control step).

Moreover, if the depressing operation with the operation section 32 has ended (Step S145: Yes), then the control section 10 stops the continuous mode in the state in which the first image that has displayed in the display section 31 at the time point when the depressing operation of the operation section 32 has ended is displayed in the display section 31 (control step) (FIG. 6: END).

As described above, according to the image forming system 1 in the present embodiment, the first image is displayed in the display section 31 at the time of page turning of a preview image, and the first image is switched to the second image corresponding to the first image and the second image is displayed in the display section 31 after the generation of the second image has been completed. Consequently, the first image, the image generation of which does not take a long time, and the second image, the image generation of which takes a long time, are stepwise displayed in the display section 31. Consequently, the recognition of a page is enabled at the step at which the first image is displayed, and the checking of whether the page displayed in the display section 31 is a desired page or not can be performed rapidly.

Moreover, if the page turning is again instructed with the operation section 32 during a period from the first timing, at which the first image is displayed, to the second timing, at which the second image is displayed, then the first image on the page after the re-operation is displayed in the display section 31. If the second page turning is not instructed with the operation section 32 during the period from the first timing to the second timing, then the second image corresponding to the first image is displayed at the second timing. Consequently, if the page turning is continuously instructed, then only the second image on a desired page is displayed after the first image has been continuously displayed, and thereby the displays of unnecessary second images are omitted to enable the processing speed to be shortened. Consequently, the reaching to a desired page can be rapidly performed.

Moreover, if an instruction with the operation section 32 continues for the predetermined time (T1) or longer, then the first image is continuously displayed in the display section 31 every predetermined page interval. If the continuation of the instruction with the operation section 32 ends, then the second image on the page at the time point when the instruction with the operation section 32 ends is displayed in the display section 31. Consequently, the time of the continuous display of the first image before the display of the second image on the desired page can be shortened, and the reaching to the desired page becomes faster.

Moreover, the image forming system 1 is equipped with the operation section 32 as the setting section to set the predetermined page interval, the page interval at the time of continuously displaying the first image can be set, and the usability of the system 1 can be made to be better.

Second Embodiment

Next, a second embodiment according to the present invention will be described. In the present second embodiment, the descriptions of the parts overlapping those of the first embodiment will be omitted, and the parts different from those in the first embodiment will be mainly described.

Figure 7:
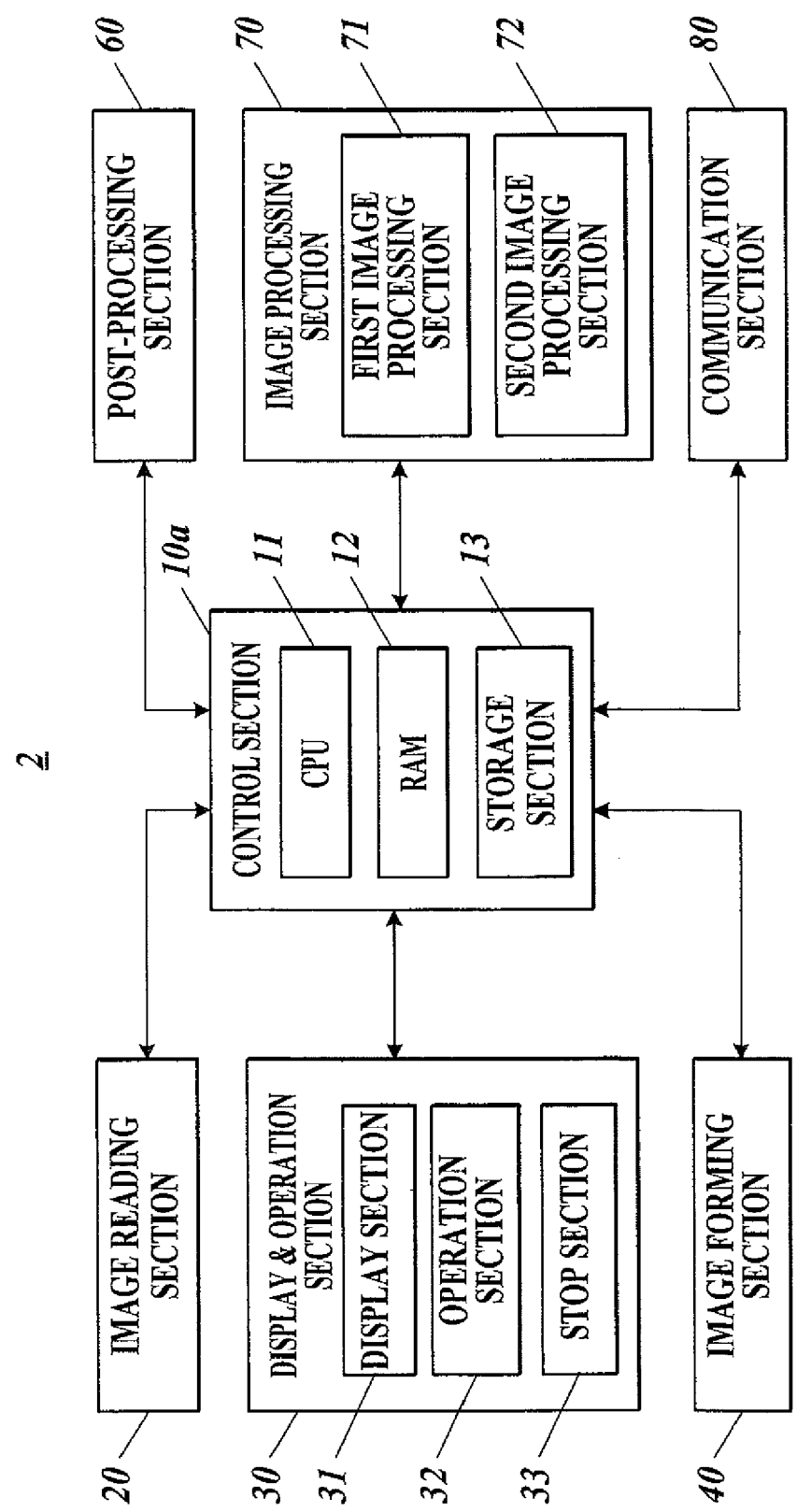
FIG. 7 is a block diagram of an image forming system according to a second embodiment.

FIG. 7 is a block diagram showing the internal configuration of an image forming system 2.

As shown in FIG. 7, the image forming system 2 according to the present embodiment includes the image reading section 20, the display & operation section 30, the image forming section 40, the paper feeding unit 50, the post-processing section 60, the image processing section 70, the communication section 80, a control section 10a, and a stop section 33 to issue a stop instruction to stop page turning.

The stop section 33 is provided in the display & operation section 30. Incidentally, the stop section 33 and the operation section 32 may be configured as the same button.

If an instruction with the operation section 32 continues for a predetermined time (T), then the control section 10a continuously displays the first image in the display section 31 every predetermined page interval (that is, "continuous mode"). If a stop instruction with the stop section 33 is issued, then the control section 10 displays the second image at the time point when the stop instruction is issued with the stop section 33 in the display section 31.

Figure 8:
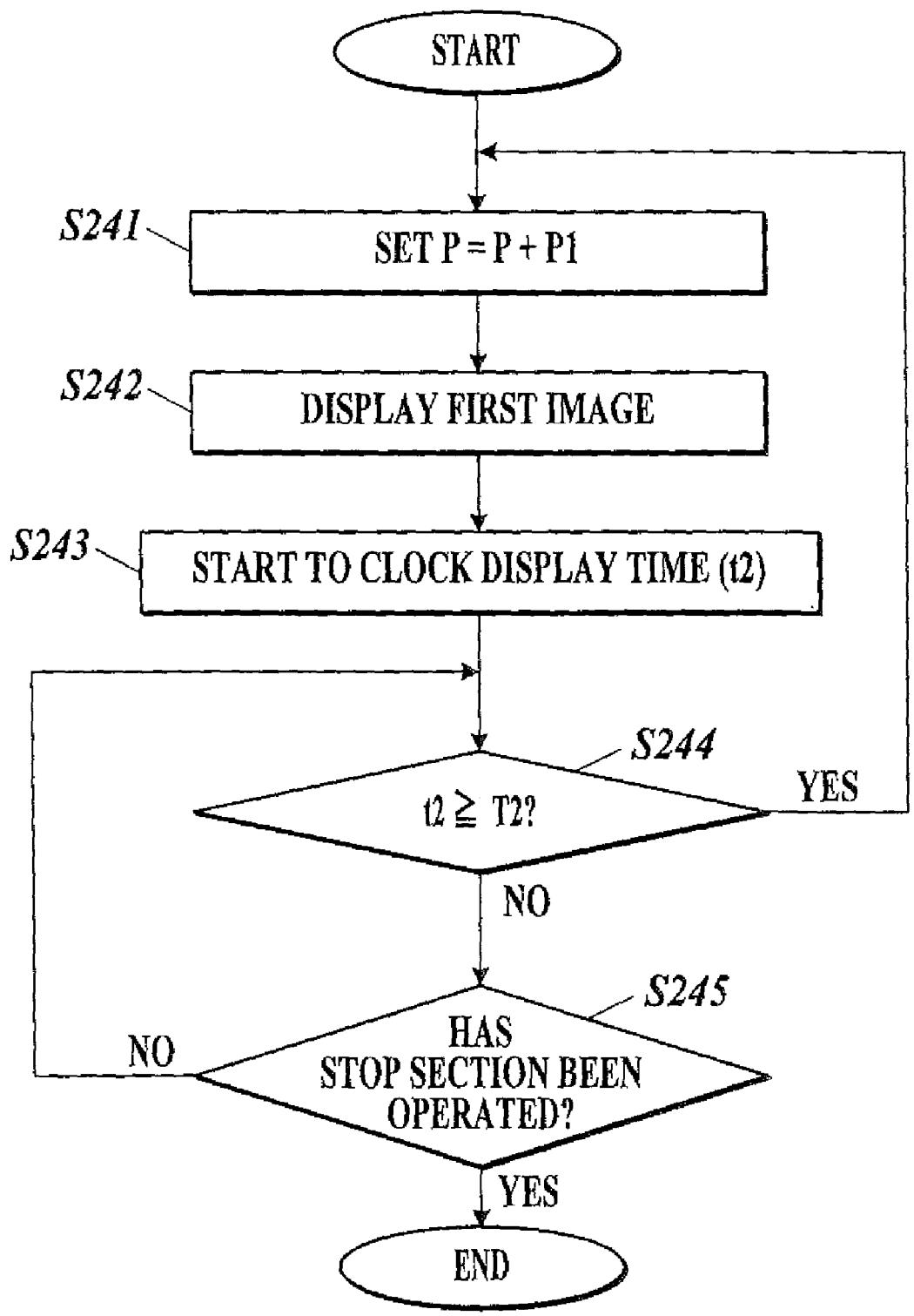
FIG. 8 is a flow chart showing the processing of a continuous mode in the second embodiment.

FIG. 8 is a flow chart showing the flow of the processing of the continuous mode in the present embodiment. Incidentally, the processing similar to that of the first embodiment is denoted by the same reference marks as those of the first embodiment, and their descriptions are omitted.

When the operation mode of the image forming system 2 is switched to the continuous mode (FIG. 8: START), the control section 10a sets P=P+P1 so that a preview image displayed in the display section 31 is displayed every predetermined page interval (P1) (setting step) (Step S241).

Next, the control section 10a displays the first image P (Step S242), and starts to clock (t2) (control step) (Step S243).

Next, control section 10a judges whether the clocked time (t2) has reached the display time (T2) or not (Step S244). If the clocked time (t2) has reached the display time (T2) (Step S244: Yes), then the control section 10a returns the processing to Step S241 to repeat the operation on and after Step S241 (control step).

On the other hand, if the clocked time (t2) has not reached the display time (T2) (Step S244: No), then the control section 10a judges whether the stop section 33 is operated or not (Step S245). If the stop section 33 is not operated (Step S245: No), then the control section 10a returns the processing to Step S244 to repeat the processing on and after Step S244 (control step).

Moreover, if the stop section 33 is operated (Step S245: Yes), then the control section 10a stops the continuous mode in the state in which the first image displayed in the display section 31 at the time point when the operation of the stop section 33 has been performed is displayed (control step) (FIG. 8: END).

As described above, according to the image forming system 2 of the present embodiment, it is needless to say that the similar advantages to those of the first embodiment can be obtained, and further it becomes possible to stop page turning by operating the stop section 33 at the time point when an arbitrary page is turned after the continuous mode has once selected by the provision of the stop section 33. Consequently, it is needless to continue depressing the operation section 32 when the page turning of the preview page is performed to a large degree, and the usability of the image forming system 2 can be made to be better.

Incidentally, although the case of performing page turning from the initial page to the succeeding pages is illustrated to be described in the embodiments described above, it is also possible to perform the page turning to the pages before the initial page. In this case, only the thing required for realizing the function is to use the previous page key B1 as the operation section 32.

Moreover, although the embodiments described above are configured to enter the continuous mode when an instruction with the operation section 32 continues for the predetermined time (T) or longer, the entering of the continuous mode is not limited to this case. For example, the configuration of entering the continuous mode when the number of times of operations of the operation section 32 in a certain time becomes more than a previously set number of times or more may be adopted.

Moreover, although the embodiments described above are configured to start to produce the next second image at a time point when the production of a second image under production has been completed, the configuration of stopping the production of the second image under production at the time point when a second time operation of the operation section 32 is performed and starting to produce the next second image may be adopted.

Moreover, although the embodiments described above have the configuration of displaying only the first image in the display section 31 continuously every predetermined page interval in the case of the continuous mode, a part of the first image may be replace with the second image. To put it concretely, for example, the first image on a fifth page, a tenth page, and a fifteenth page is displayed every five page interval, and then the second image can be displayed at twentieth page. Then, the first image on a twenty-fifth page, a thirtieth page, and a thirty fifth page is again displayed, and then the second image on a fortieth page can be displayed again.

The entire disclosure of Japanese Patent Application No. 2008-166773 filed on Jun. 26, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image forming apparatus comprising:
    a display section to execute display based on image data including a plurality of images;
    a first image processing section to generate first images respectively corresponding to the images included in the image data, to which an image process based on information of a job regarding editing and post-processing is not executed;
    a second image processing section to generate a second image obtained by executing the image process based on the information of the job regarding the editing and the post-processing to the image data of the first image currently displayed in the display section; and
    a control section to cause the display section to display the first image corresponding to the image data to which the job is set before completing the generation of the corresponding second image by the second image processing section and to change the currently displayed first image to the corresponding second image after completing the generation of the corresponding second image by the second image processing section.

2. The image forming apparatus of claim 1, further comprising an operation section to issue an instruction of changing the first or second image currently displayed in the display section to the first image different from the currently displayed first or second image, wherein
    the control section causes the display section to display the first image different from the currently displayed first or second image at a first timing and to display the corresponding second image at a second timing after the first timing if the instruction is issued with the operation section.

3. The image forming apparatus of claim 2, wherein the control section causes the display section to display the first image different from the currently displayed first image if the instruction is issued with the operation section during a period from the first timing to the second timing, and to display the second image corresponding to the currently displayed first image at the second timing if no instruction is issued with the operation section during the period from the first timing to the second timing.

4. The image forming apparatus of claim 2, wherein the control section causes the display section to continuously display and change the first image at a predetermined interval of the number of images if the instruction with the operation section continues for a predetermined time or longer, and to display the second image, which corresponds to the image data of the first image displayed at a time when the continuing instruction with the operation section ends.

5. The image forming apparatus of claim 4, further comprising a setting section to set the predetermined interval of the number of images.

6. The image forming apparatus of claim 2, further comprising a stop section to issue an instruction to stop changing the currently displayed first image to the first image different from the currently displayed first image, wherein
the control section causes the display section to continuously display and change the first image at a predetermined interval of the number of images if the instruction with the operation section continues for a predetermined time or longer, and to display the second image, which corresponds to the image data of the first image displayed at a time when the stop instruction is issued with the stop section.

7. The image forming apparatus of claim 6, further comprising a setting section to set the predetermined interval of the number of images.

8. The image forming apparatus of claim 1, wherein the editing is a process for generating an image composed of a plurality of aggregated images and the post-processing is a process for generating an image including information regarding a position at which a punching processing is to be executed.

9. An image forming method comprising the steps of:
generating first images respectively corresponding to a plurality of images included in image data, to which an image process based on information of a job regarding editing and post-processing is not executed;
generating a second image obtained by executing the image process based on the information of the job regarding the editing and the post-processing to the image data of the first image currently displayed in a display section; and
displaying the first image corresponding to the image data to which the job is set before completing the generation of the corresponding second image by the second image processing section in the display section, and changing the currently displayed first image to the corresponding second image after completing a generation of the corresponding second image.

10. The image forming method of claim 9, wherein the step of displaying the first image displays the first image different from the currently displayed first or second image in the display section at a first timing and displays the corresponding second image in the display section at a second timing after the first timing if an instruction of changing the first or second image currently displayed in the display section to the first image different from the currently displayed first or second image with an operation section for issuing the instruction.

11. The image forming method of claim 10, wherein the step of displaying the first image displays the first image different from the currently displayed first image in the display section if the instruction is issued with the operation section during a period from the first timing to the second timing, and displays the second image corresponding to the currently displayed first image at the second timing if no instruction is issued with the operation section during the period from the first timing to the second timing.

12. The image forming method of claim 10, wherein the step of displaying the first image continuously displays and changes the first image at a predetermined interval of the number of images if the instruction with the operation section continues for a predetermined time or longer, and displays the second image, which corresponds to the image data of the first image displayed at a time when the continuing instruction with the operation section ends.

13. The image forming method of claim 12, further comprising a step of setting the predetermined interval of the number of images with the setting section.

14. The image forming method of claim 10, wherein the step of displaying the first image continuously displays and changes the first image in the display section at a predetermined interval of the number of images if the instruction with an operation section continues for a predetermined time or longer, and displays the second image, which corresponds to the image data of the first image displayed at a time when a stop instruction is issued with a stop section for issuing the stop instruction to stop changing the currently displayed first image to the first image different from the currently displayed first image.

15. The image forming method of claim 14, further comprising a step of setting the predetermined interval of the number of images with the setting section.

16. The image forming method of claim 9, wherein the editing is a process for generating an image composed of a plurality of aggregated images and the post-processing is a process for generating an image including information regarding a position at which a punching processing is to be executed.

* * * * *